(12) United States Patent
Billotey et al.

(10) Patent No.: US 8,721,287 B2
(45) Date of Patent: May 13, 2014

(54) COMPRESSOR IMPELLER BLADE WITH VARIABLE ELLIPTIC CONNECTION

(75) Inventors: Geoffroy Louis-Henri Marie Billotey, Pau (FR); Pierre Biscay, Lons (FR); Gilles Cazenave-Larroche, Lee (FR); Jean-Philippe Ousty, Soumoulou (FR)

(73) Assignee: Turbomeca, Bordes (FR)

( * ) Notice: Subject to any disclaimer, the term of this patent is extended or adjusted under 35 U.S.C. 154(b) by 727 days.

(21) Appl. No.: 12/990,953

(22) PCT Filed: May 14, 2009

(86) PCT No.: PCT/EP2009/055815
§ 371 (c)(1),
(2), (4) Date: Nov. 4, 2010

(87) PCT Pub. No.: WO2009/138445
PCT Pub. Date: Nov. 19, 2009

(65) Prior Publication Data
US 2011/0064583 A1 Mar. 17, 2011

(30) Foreign Application Priority Data

May 15, 2008 (FR) ..................................... 08 53140

(51) Int. Cl.
*F04D 29/38* (2006.01)
(52) U.S. Cl.
USPC ... 416/185; 416/183; 416/223 B; 416/DIG. 2; 415/206

(58) Field of Classification Search
USPC .............. 415/204, 206; 416/183, 185, 186 R, 416/188, 223 B, 234, DIG. 2
See application file for complete search history.

(56) References Cited

U.S. PATENT DOCUMENTS

| 5,215,439 A | 6/1993 | Jansen et al. |
| 6,012,901 A * | 1/2000 | Battig et al. ............... 416/244 A |
| 6,969,232 B2 * | 11/2005 | Zess et al. ...................... 416/234 |
| 2004/0005220 A1 | 1/2004 | Kawamoto et al. |

FOREIGN PATENT DOCUMENTS

| CN | 2743586 Y | 11/2005 |
| CN | 1869449 A | 11/2006 |
| DE | 10 16 888 | 10/1957 |
| WO | WO 92/13197 | 8/1992 |

OTHER PUBLICATIONS

U.S. Appl. No. 13/201,542, filed Aug. 15, 2011, Billotey et al.
U.S. Appl. No. 13/256,371, filed Sep. 13, 2011, Billotey et al.
International Search Report issued Jul. 13, 2009 in PCT/EP09/55815 filed May 14, 2009.
Combined Office Action and Search Report issued Dec. 26, 2012 in Chinese Application No. 200980116931.5 (With English Translation and English Translation of Category of Cited Documents).

* cited by examiner

*Primary Examiner* — Christopher Verdier
(74) *Attorney, Agent, or Firm* — Oblon, Spivak, McClelland, Maier & Neustadt, L.L.P.

(57) ABSTRACT

A compressor impeller including at least one blade connected to an impeller hub via a junction of curved shape, the blade extending along a defined chord between a leading edge and a trailing edge of the blade. The junction presents the shape of an ellipse that varies along the chord.

6 Claims, 2 Drawing Sheets

COMPRESSOR IMPELLER BLADE WITH VARIABLE ELLIPTIC CONNECTION

BACKGROUND OF THE INVENTION

1. Field of the Invention

The present invention relates to the field of gas turbines, such as those fitted to the turbine engines of aircraft. The invention relates more particularly to the compression stage of such a gas turbine.

2. Description of the Related Art

A gas turbine compression stage generally comprises a rotary compressor designed to compress the fresh air entering the gas turbine. Amongst the various known types of compressor, it is possible to distinguish between compressors of centrifugal type, and compressors of axial type. Unlike an axial compressor, a centrifugal compressor changes the flow direction of the air stream: on leaving the compressor, the air stream generally flows in a direction that is substantially orthogonal to the axis of rotation of the compressor, and in particular an angle of inclination in the range 0° to 30° is acceptable between the air stream (i.e. the stream of air at the trailing edge of the impeller) and a direction orthogonal to the axis of rotation of the compressor.

More precisely, the present invention relates to a compressor impeller having at least one blade connected to an impeller hub via a fillet or junction of curved shape, said blade extending along a chord defined between a leading edge and a trailing edge of the blade, the junction presenting a shape that varies continuously along the chord.

Conventionally, the air stream entering into the impeller of a centrifugal compressor comes initially into contact with the leading edge of the blade and then runs along the chord of the blade prior to leaving the impeller via the trailing edge.

In the meaning of the present invention, the junction is the geometrical line connecting the blade to the hub at the location of the blade root, which root defines the connection between the blade and the hub. There is a connection on each side of the blade, on the pressure side and on the suction side.

In operation, the blades of the compressor impeller are subjected to high levels of mechanical stress that, under certain circumstances, are capable of damaging them (crack initiation, crack propagation, loss of a fragment of the blade).

The use of a junction that is curved in shape then makes it possible, under certain circumstances and depending on how the selected curved shape is defined, to improve or degrade the mechanical strength of blades, in particular in the blade root zone.

Depending on the zone of the blade (defined along its chord), it is possible either to improve the mechanical strength of the blade or to reduce the mechanical strength of the blade. This applies in particular at the trailing edge of the impeller. The consequence of degrading the mechanical strength of the blade at the trailing edge of the impeller is to provide an improvement relating to the mechanical strength of the disk in the zone of the trailing edge. This may be desirable in order to comply with regulations. Regulations recommend a criterion for rupture ordering in which the blade must rupture before the disk (hub). In other words, the blade acts as a fuse. Given the centrifugal force and the inertia of the hub, a rupture in the hub would generate debris with greater kinetic energy than that generated by debris from a rupture of a blade. The trailing edge of the impeller is particularly concerned by this criterion insofar as the thicknesses of the blade and of the hub (web) are of the same order of magnitude in that zone.

DE 10 16 888 shows a junction between a blade and a hub that varies along the chord.

BRIEF SUMMARY OF THE INVENTION

An object of the present invention is to propose a variant compressor impeller in which the mechanical strength of the blade differs along the chord.

The invention achieves this object by the fact that the junction presents a shape that varies in continuous manner along the chord, the junction being a portion of an ellipse.

This variation of shape is selected as a function of the variation of mechanical strength that it is desired to obtain along the chord, either within the blade or between the blade and the disk.

In other words, the variation in the shape of the curve that constitutes the junction is continuous along the chord, thereby causing the mechanical strength of the blade likewise to vary continuously along the chord.

Advantageously, it may be the same ellipse or it may be an ellipse having major and minor axes that vary on moving along the chord.

In another variant, the curved junction is constituted by two portions having two distinct radii that vary continuously along the chord and that become interchanged between the leading edge and the trailing edge.

Advantageously, the ellipse has a major axis and a minor axis, the junction being shaped in such a manner that at the leading edge, the major axis of the ellipse is substantially parallel to the flank of the blade, while at the trailing edge the major axis of the ellipse is substantially perpendicular to the flank of the blade.

This continuously varying elliptical shape presents several advantages: a first advantage is to improve the mechanical strength of the blade at its leading edge by maintaining the same thickness for the blade (decreasing the stress concentration coefficient, $K_t$, in the junction zone of the blade). A second advantage is to reduce the thickness of the blade at its leading edge while maintaining the same mechanical strength, thereby advantageously reducing the weight of the impeller.

Furthermore, reducing the thickness of the blade at its leading edge serves advantageously to improve the performance of the compressor.

A third advantage is to provide a blade having mechanical strength at its trailing edge that is significantly reduced compared with a configuration in which the junction at the trailing edge is identical to the junction at the leading edge. More precisely, the mechanical strength of the blade relative to the web of the hub is reduced at the trailing edge. By means of the present invention, the mechanical strength of the blade (beside the minor axis of the junction ellipse) is reduced and simultaneously the mechanical strength of the web (beside the major axis of the junction ellipse) is increased. This enables the compressor impeller of the invention to satisfy the above-mentioned regulations that recommend the blade giving way before the disk of the impeller hub.

A fourth advantage is that the elliptical junction at the trailing edge, where the major axis is substantially perpendicular to the flank of the blade, serves to reduce the magnitude of the wake that forms at the blade root, thereby further improving the performance of the compressor.

Preferably, the ratio of the major axis to the minor axis lies in the range 1.1 to 4.

Preferably, this ratio is substantially equal to 2. With this value, the inventors have observed a significant improvement in the mechanical strength for given thickness of the leading edge, while sufficiently reducing the mechanical strength of the blade at the trailing edge in order to comply with the regulations in force (document EASA "Certification specifications for engines", paragraph AMC E 520).

Preferably, the junction varies by causing the values of the axes of the ellipse to vary continuously.

Thus, when going along the chord from the leading edge to the trailing edge, the minor axis of the ellipse increases, while its major axis decreases such that the ellipse at the trailing edge corresponds to the ellipse at the leading edge pivoted through 90°.

In other words, by causing the axes of the ellipse to vary along the chord, they end up being interchanged.

The ellipse of the junction presents a major axis along the blade and a minor axis along the hub at the leading edge, and a major axis along the hub and a minor axis along the blade at the trailing edge. More generally, the values of the major axis and of the minor axis may be different at the leading edge and at the trailing edge, their values varying continuously between the leading edge and the trailing edge.

As a result, when considered along the chord of the blade, the portion of the ellipse that constitutes the junction varies continuously between the leading edge and the trailing edge.

The invention also provides a centrifugal compressor including a compressor impeller in accordance with the invention.

In the meaning of the invention, the term "centrifugal compressor" is used to mean compressors in which the direction of the exiting gas stream is inclined relative to a direction orthogonal to the axis of rotation of the impeller at an angle lying in the range 0° to 30°.

Finally, the invention provides a turbomachine including a compressor that is centrifugal or of the mixed-flow type in which the trailing edge is inclined relative to the orthogonal direction of the axis of rotation of the impeller in accordance with the present invention.

BRIEF DESCRIPTION OF THE SEVERAL VIEWS OF THE DRAWINGS

The invention can be better understood and its advantages appear better on reading the following description of an embodiment given by way of non-limiting example. The description refers to the accompanying drawings, in which.

DETAILED DESCRIPTION OF THE INVENTION

The compressor impeller of the present invention may be used either in a mixed-flow type compressor or in a centrifugal type compressor. Nevertheless, the invention is illustrated herein by way of example on the basis of a centrifugal compressor in a helicopter gas turbine.

Figure 1:
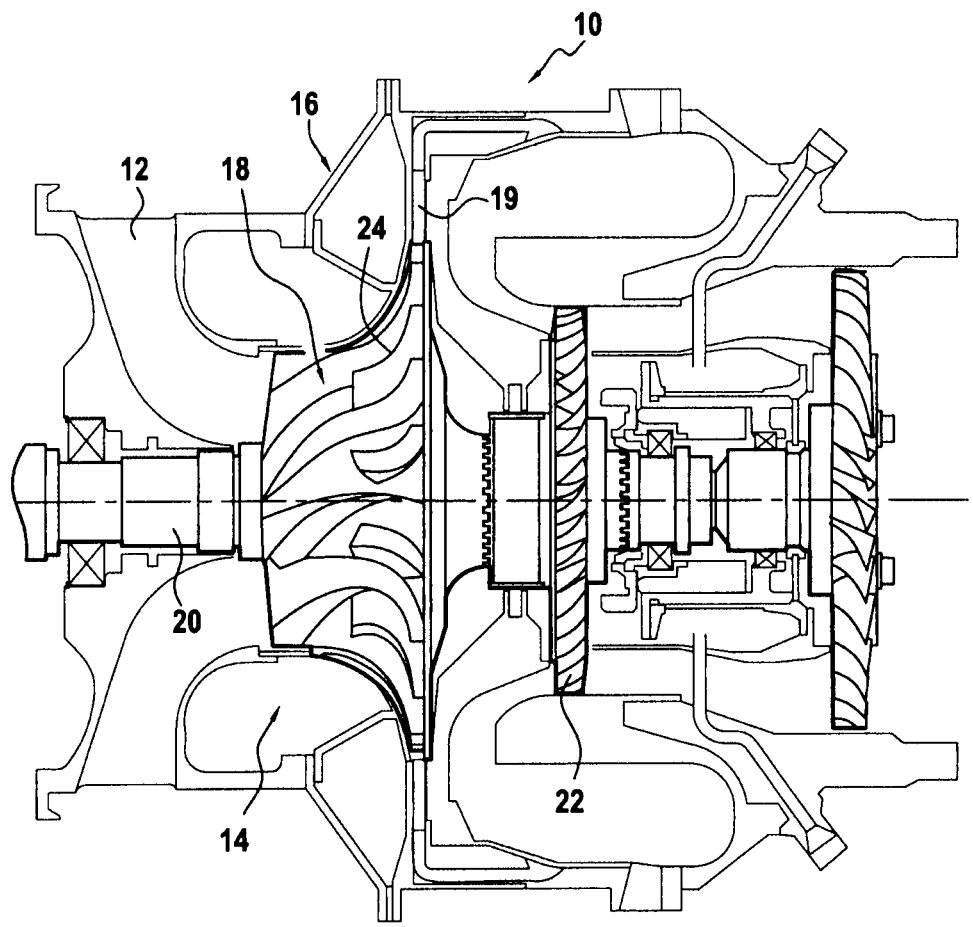
FIG. 1 is a general view of a helicopter turbine engine including a centrifugal compressor having an impeller of the invention.

FIG. 1 represents a gas turbine 10 of a helicopter (not shown here), comprising a fresh air inlet 12 for feeding a compression stage 14. Specifically, the compression stage is constituted by a single compressor 16 comprising an impeller 18 and a centrifugal diffuser 19 that is itself known.

The impeller 18 is mounted on a shaft 20 that is driven in rotation by a turbine 22. Generally, the impeller 18 is formed as a single piece and is obtained by machining a raw block, usually made of titanium or of Inconel.

Figure 2A:
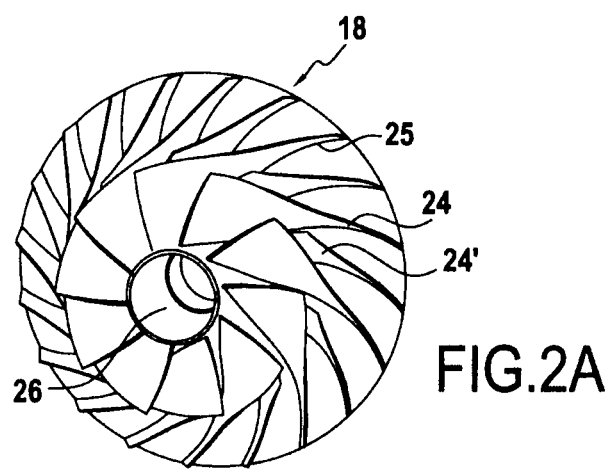
FIG. 2A is a perspective view of the impeller of the centrifugal compressor of FIG. 1.
Figure 2B:
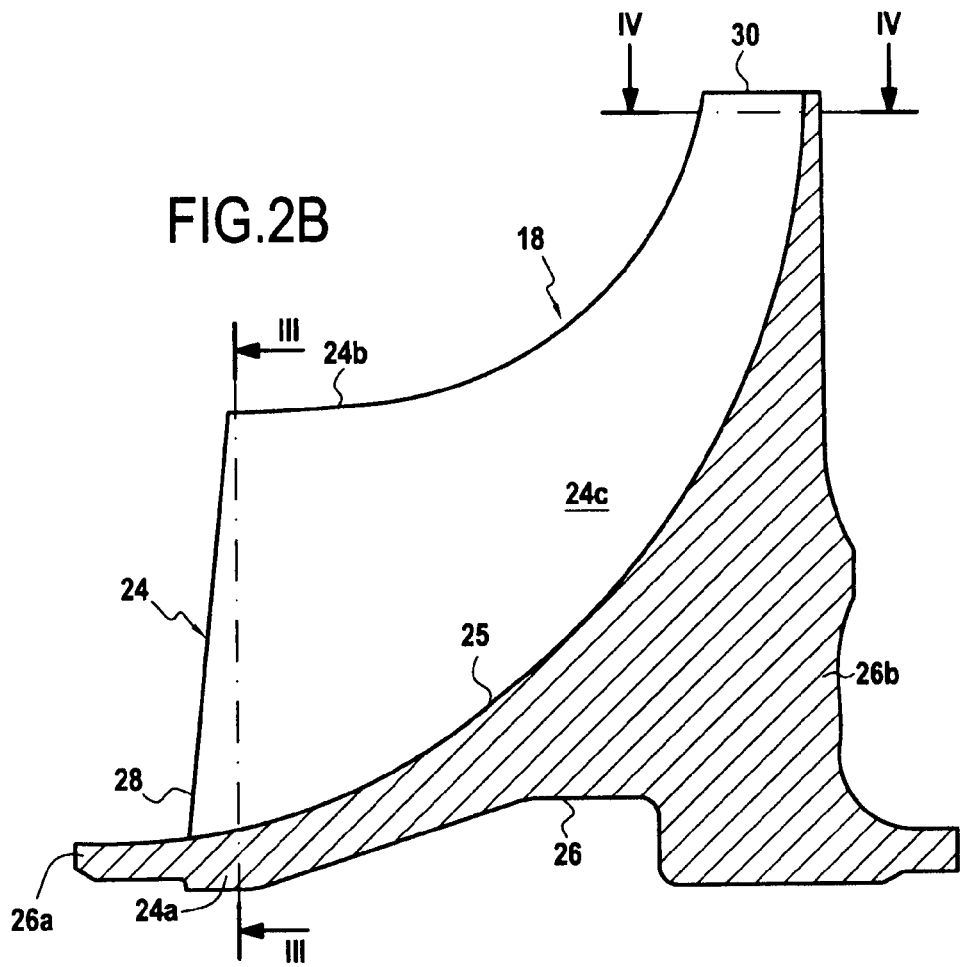
FIG. 2B is a half-view in axial section of the FIG. 2A impeller.

As can be seen better in FIGS. 2A and 2B, the impeller 18 has a plurality of main blades 24 extending from a disk 26a to a hub 26. More precisely, each blade 24 comprises a blade body 24c that extends between a blade root 24a and a top 24b.

Furthermore, each blade 24 extends along a chord 25 defined between a leading edge 28 and a trailing edge 30. The impeller 18 also has secondary blades 24' that are shorter than the main blade 24 and that have their leading edges set back from those of the main blades 24.

The connection between each blade 24 and the hub 26 of the impeller 18 takes place at the location of the blade root 24a via a junction 27 that forms a curve. This junction corresponds to the local shape of the blade root where the blade body joins the hub 26.

Figure 3:
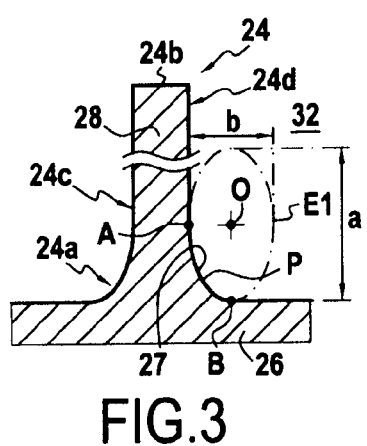
FIG. 3 is a diagrammatic view of the leading edge of a blade of the FIG. 2 impeller, considered in a plane that is orthogonal to the chord of the blade.
Figure 4:
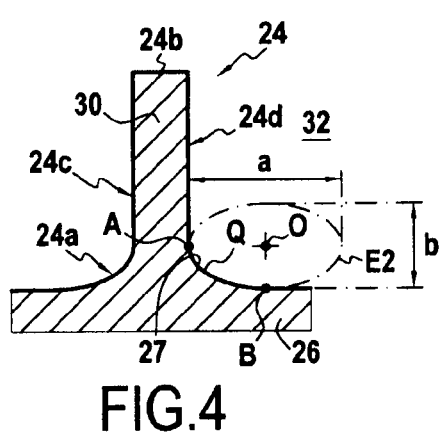
FIG. 4 is a diagrammatic view of the trailing edge of the FIG. 3 blade, considered in a plane that is orthogonal to the chord of the blade.

With reference to FIGS. 3 and 4, there follows a more detailed description of the varying junction in accordance with the present invention.

FIG. 3 is a diagrammatic section view of the leading edge 28 of one of the blades 24, viewed in a plane that is orthogonal to the chord 25. The view is diagrammatic since, for reasons of simplicity, the blade is shown as being straight, whereas in general the blades of a centrifugal compressor are inclined. In addition, the heights of the leading and trailing edges of the blade and the thicknesses of the blade or the hub are shown diagrammatically and are not representative.

As can be seen in the figure, the junction 27 on the pressure side 32 presents a curved shape, and more particularly the shape of a first portion P of an ellipse E1 that is drawn in chain-dotted lines. The ellipse thus lies in the plane of FIG. 3.

It can be seen that the ellipse E1 is tangential both to the hub 26 and to the flank 24d of the blade 24, such that the junction 27 is itself tangential both to the blade 24 and to the hub 26.

Furthermore, the ellipse E1 presents a center O, and a major axis a and a minor axis b that are mutually orthogonal.

According to the invention, the junction 27 is shaped in such a manner that the major axis a of the ellipse E1 is substantially parallel to the flank 24d of the blade 24 in the zone of the leading edge 28.

In FIG. 3, point A represents the point of tangency of the ellipse E1 with the blade 24, while point B represents the point of tangency of the ellipse E1 with the hub 26.

With this shape for the junction 27, it has been found that the mechanical strength of the blade 24 in this location of the chord 25 is particularly good, compared with a conventional configuration using a junction of constant radius.

When the blade 24 is not orthogonal to the hub 26, the first portion P of the ellipse E1 is still selected so that the junction 27 is tangential to the hub 26 and to the flank 24d of the blade 24.

FIG. 4 is a diagrammatic section view of the trailing edge 30 of the blade 24 of FIG. 3, seen in a plane that is orthogonal to the chord 25.

As can be seen in this figure, the junction 27 on the pressure side 32 (and here, preferably, also on the suction side) presents the shape of a curve, and more precisely a second portion Q of an ellipse E2. This ellipse thus lies in the plane of FIG. 4. It can be seen that the ellipse E2 corresponds to the ellipse E1 pivoted through 90°.

The ellipse E2 is tangential both to the hub 26 and to the flank 24d of the blade 24, such that the junction 27 is itself tangential to the blade 24 and to the hub 26.

In FIG. 4, the point A represents the point of tangency of the ellipse E2 with the blade 24, while the point B represents the point of tangency of the ellipse E2 with the hub 26.

Unlike FIG. 3, the major axis a is substantially perpendicular to the flank 24d of the blade 24. With the junction 27 having this shape, the mechanical strength at this location of the chord 25 is less good than its strength at the leading edge 28 of the blade 24.

As a result, at the leading edge (FIG. 3), the zone situated around the point A presents improved mechanical strength, while the mechanical strength of the zone situated around the point B is reduced. This reduction in mechanical strength is nevertheless of no consequence since at the leading edge 28, the hub is thick and subjected to very little stress.

Conversely, at the trailing edge 30 (FIG. 4), the zone situated around the point A presents reduced mechanical strength while the zone situated around the point B presents improved mechanical strength.

Thus, in advantageous manner, there are obtained both improved mechanical strength at the leading edge 28 (compared with a conventional configuration having a junction of constant radius and uniform flow section), and improved ordering of rupture at the trailing edge 30 (the blade ruptures before the disk).

When the blade 24 is not orthogonal to the hub 26, the second portion Q of the ellipse E2 is still selected so that the junction 27 is tangential to the hub 26 and to the flank 24d of the blade 24.

Preferably, the ratio of the major axis a to the minor axis b lies in the range 1.1 to 4, and specifically is about 2.

It can thus be understood that FIGS. 3 and 4 show the shape of the junction 27 at two extremities of the blade 24, i.e. at its leading edge 28 and at its trailing edge 30.

Between these two extreme positions, the shape of the junction varies continuously, given the continuous variation in the values of the axes a and b of the ellipse so as to obtain a smooth transition between two junction shapes that are significantly different.

For this purpose, the junction 27 varies by causing the values of the axes of the ellipse to vary continuously between the leading edge 28 and the trailing edge 30. In other words, at each point of the chord 25, the junction 27 constitutes a portion of an ellipse. It follows that the continuous variation in the values of the axes of the ellipse leads to continuous variation in the elliptical junction 27 along the chord.

In any event, the junction 27 is shaped to be tangential both to the flank 24d of the blade 24 and to the hub 26, with this being true at all points along the chord 25, both on the pressure side and on the suction side.

Preferably, for a given chord, the junction ellipse for the suction side is identical to that for the pressure side.

Other advantages associated with the present invention are given below.

Firstly, the particular shape at the trailing edge 30, as shown in FIG. 4, serves advantageously to improve the ability of the impeller to withstand erosion by increasing the quantity of material at the blade root where erosion takes place.

Secondly, the particular shape at the leading edge 28 (FIG. 3) serves to reduce the stress concentration coefficient so that the blades 24, 24' present improved ability to withstand potential introduction of foreign bodies into the impeller.

Thirdly, the shape of the impeller blade junction serves to reduce the axial thickness of the web 26b of the hub 26, thereby improving the lifetime and the burst margin of the disk 26a.

The invention claimed is:

1. A compressor impeller comprising:
at least one blade connected to an impeller hub by a junction of curved shape, the blade extending along a chord defined between a leading edge and a trailing edge of the blade, the junction presenting a shape that varies continuously along the chord,
wherein the junction is a portion of an ellipse, and
wherein, at the leading edge and at the trailing edge, the junction is tangential to the impeller hub and to a flank of the blade.

2. The compressor impeller according to claim 1, wherein the ellipse has a major axis and a minor axis, the junction being shaped such that at the leading edge, the major axis of the ellipse is substantially parallel to the flank of the blade, and at the trailing edge, the major axis of the ellipse is substantially perpendicular to the flank of the blade.

3. The compressor impeller according to claim 2, wherein the ratio of the major axis to the minor axis lies in a range of 1.1 to 4.

4. The compressor impeller according to claim 1, wherein the shape of the junction is caused to vary by causing lengths of axes of the ellipse to vary continuously.

5. A centrifugal compressor comprising an impeller according to claim 1.

6. A turbomachine comprising a compressor according to claim 5.

* * * * *